(12) United States Patent
Krouse

(10) Patent No.: US 8,123,457 B2
(45) Date of Patent: Feb. 28, 2012

(54) SYSTEM AND APPARATUS FOR IMPROVED TURBINE PRESSURE AND PRESSURE DROP CONTROL USING TURBINE HEAD POTENTIAL

(75) Inventor: Wayne F. Krouse, Houston, TX (US)

(73) Assignee: Hydro Green Energy, LLC, Westmont, IL (US)

( * ) Notice: Subject to any disclaimer, the term of this patent is extended or adjusted under 35 U.S.C. 154(b) by 932 days.

(21) Appl. No.: 12/157,396

(22) Filed: Jun. 10, 2008

(65) Prior Publication Data

US 2008/0277940 A1 Nov. 13, 2008

Related U.S. Application Data

(63) Continuation-in-part of application No. 12/079,277, filed on Mar. 26, 2008.

(60) Provisional application No. 60/920,255, filed on Mar. 27, 2007, provisional application No. 60/934,369, filed on Jun. 13, 2007.

(51) Int. Cl.
*F03B 13/12* (2006.01)
(52) U.S. Cl. .................. 415/3.1; 415/7; 290/53; 290/54
(58) Field of Classification Search .................. 415/3.1, 415/7; 290/53, 54
See application file for complete search history.

(56) References Cited

U.S. PATENT DOCUMENTS

| | | | | |
|---|---|---|---|---|
| 4,421,990 A * | 12/1983 | Heuss et al. | ..................... | 290/53 |
| 4,868,408 A * | 9/1989 | Hesh | ............................... | 290/52 |
| 5,440,176 A * | 8/1995 | Haining | .......................... | 290/54 |
| 6,168,373 B1 * | 1/2001 | Vauthier | ............................ | 415/7 |
| 6,647,716 B2 * | 11/2003 | Boyd | .............................. | 60/398 |
| 6,982,498 B2 * | 1/2006 | Tharp | .............................. | 290/54 |
| 7,442,002 B2 * | 10/2008 | Mondl | ............................. | 415/7 |
| 7,471,009 B2 * | 12/2008 | Davis et al. | ..................... | 290/54 |
| 7,948,107 B2 * | 5/2011 | Fraenkel | ......................... | 290/54 |
| 8,022,567 B2 * | 9/2011 | Davis et al. | ..................... | 290/54 |

* cited by examiner

*Primary Examiner* — Jarrett Stark
*Assistant Examiner* — Nicholas Tobergte

(57) ABSTRACT

A system for improved power generation through movement of water having a turbine positioned in a moving body of water to receive kinetic energy, a blocking fitting, attachment or wall on the upper surface of the turbine to creates head potential in a moving body of water; an energy producing cell that is driven by said head potential. The energy producing cells are positioned to receive potential energy in addition to the kinetic energy from the head effect converting said energy combination or contribution by the movement of water through the cell. The system turbine may be fitted with a member positioned circumferentially about the housing for inducing a pressure drop across the turbine. The member may be a rotating blade, cantilevered duct, circumferential flange, radial eductor, and air tube for injection of ambient air into said water source.

18 Claims, 4 Drawing Sheets

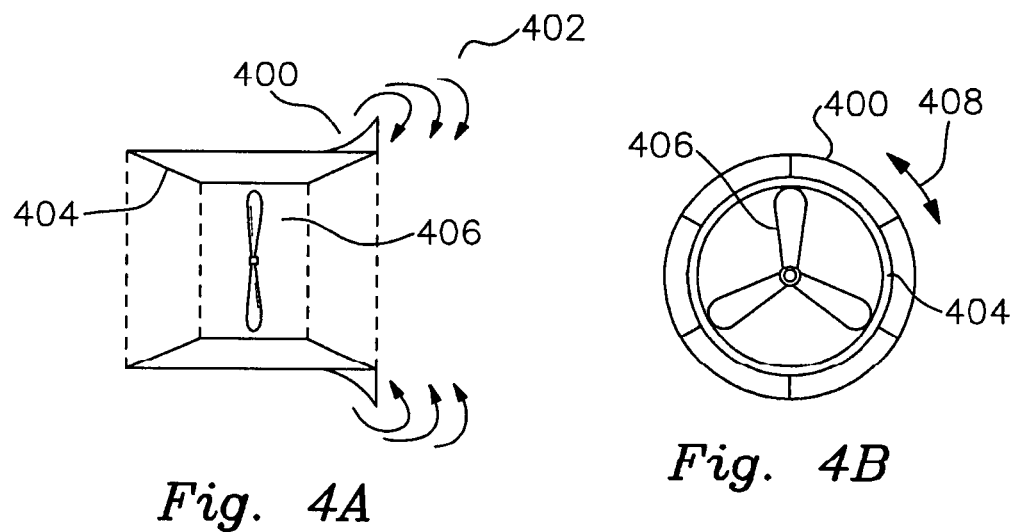
Fig. 4A
Fig. 4B
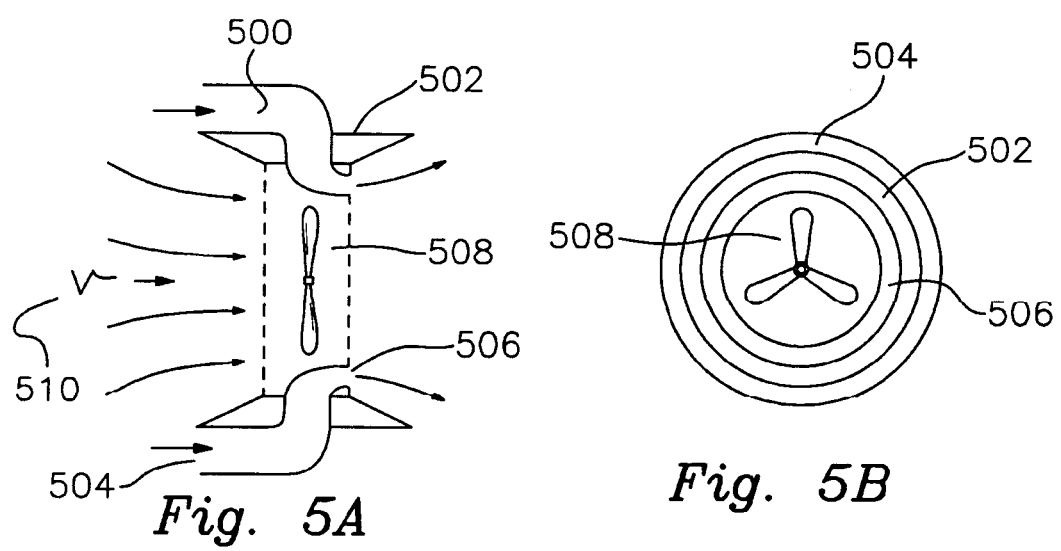
Fig. 5A
Fig. 5B

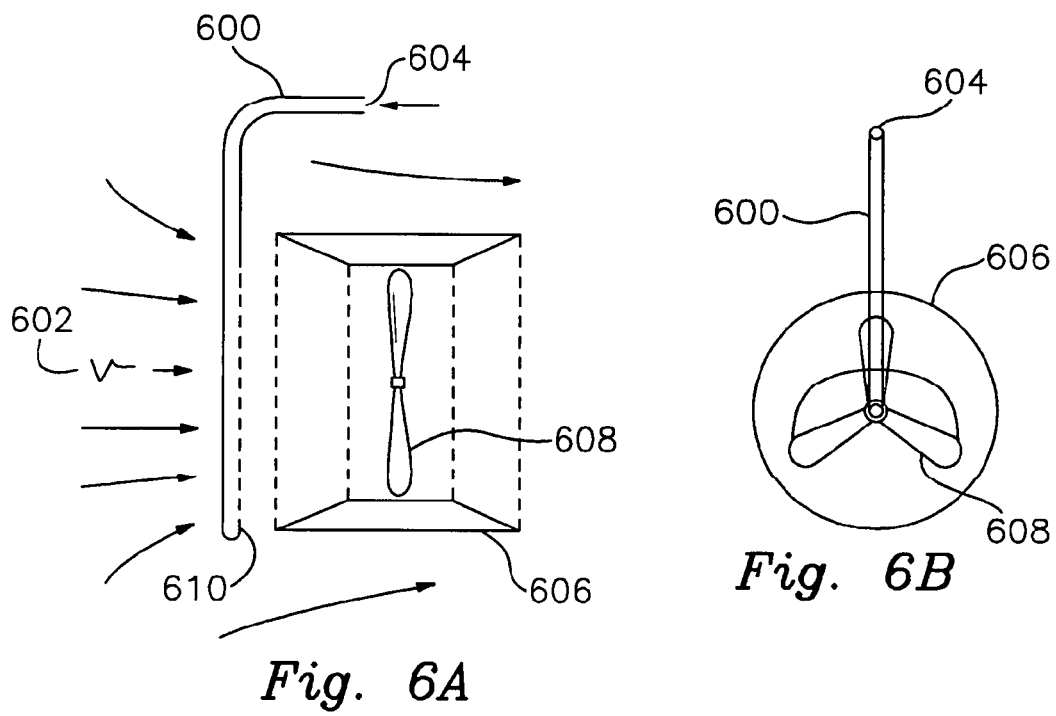
Fig. 6A
Fig. 6B
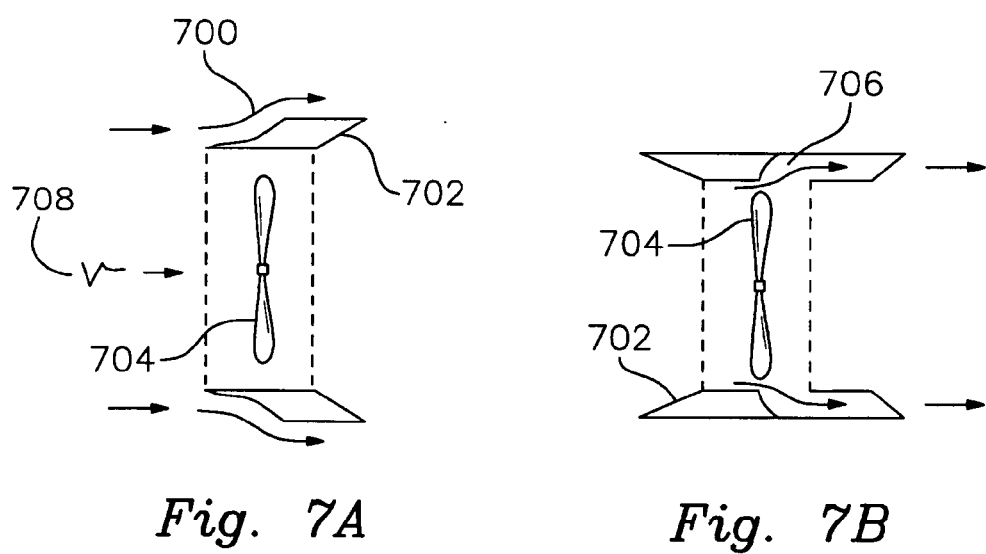
Fig. 7A
Fig. 7B

SYSTEM AND APPARATUS FOR IMPROVED TURBINE PRESSURE AND PRESSURE DROP CONTROL USING TURBINE HEAD POTENTIAL

CROSS REFERENCE TO RELATED APPLICATIONS

This is a continuation in part of pending application Ser. No. 12/079,277 filed Mar. 26, 2008, which is related to provisional patent application No. 60/920,255 filed Mar. 27, 2007 and is related to provisional patent application No. 60/934,369 titled "Methods and apparatus for improved hydropower system using turbine head potential," filed on Jun. 13, 2007, which is hereby incorporated by reference as if fully set forth herein.

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of hydroelectric power and more specifically to a system and apparatus for improved turbine pressure and pressure drop control.

There are a variety of prior art systems for increasing power through conventional turbines. None of these patents shows the innovative combination of the present invention and its use of various enhancements to control pressure drop at the rotating turbine. This invention works with both horizontal and vertical axis hydrokinetic turbines.

BRIEF SUMMARY OF THE INVENTION

The primary advantage of the invention is to provide improved turbine throughput from higher velocity than ambient conditions.

Another advantage of the invention is to provide improved enhancements to turbine flow properties.

Another advantage of the invention is to provide eductors or ejectors to enhance turbine flow characteristics.

Another advantage of the invention is to provide counter rotating members to enhance turbine flow characteristics.

Another advantage of the invention is to efficiently increase velocity through a turbine and have the greatest impact on power output.

The present invention accomplishes the foregoing objects by incorporating in a hydrokinetic turbine installation a variety of mechanisms and devices to modify water flow and increase the pressure drop between the inducted water flow and the outflow across a hydrokinetic turbine, thus increasing water velocity and hence increase energy produced by the hydrokinetic turbine installation.

In accordance with the invention, there is shown a system for power generation through movement of water having one or more energy producing cells positioned in a moving body of water to receive kinetic energy, and a blocking wall on the upper surface of the cells that creates head potential in the moving body of water. The cells are positioned to receive potential energy in addition to the kinetic energy thereby converting this energy combination by the movement of water through the cells.

In accordance with the invention, there is shown a system for power generation through movement of water having one or more turbines positioned in a moving body of water to receive kinetic energy, and a blocking wall on the upper surfaces of each of the turbines that creates head potential in the moving body of water and the turbines are positioned to receive potential energy in addition to the kinetic energy thereby converting the energy combination by the movement of water through the turbines In accordance with the invention, there is shown a system for improved power generation through movement of water having one or more cells positioned in a moving body of water to receive kinetic energy, and a blocking wall on the upper surface of the cells. The cells are positioned to receive potential energy from water flow and kinetic energy from resultant head created by the blocking wall, and have a generally cylindrical housing about the cells and a circumferential rotating blade about the housing.

Other objects and advantages of the present invention will become apparent from the following descriptions, taken in connection with the accompanying drawings, wherein, by way of illustration and example, an embodiment of the present invention is disclosed.

BRIEF DESCRIPTION OF THE DRAWINGS

The drawings constitute a part of this specification and include exemplary embodiments to the invention, which may be embodied in various forms. It is to be understood that in some instances various aspects of the invention may be shown exaggerated or enlarged to facilitate an understanding of the invention.

FIG. 4A shows a cross sectional view of a circumferential fixed flange about a turbine that creates turbulence in accordance with a preferred embodiment of the present invention. FIG. 4B shows a longitudinal elevation view of FIG. 4A.

FIG. 5A shows a side cross sectional view of a radial eductor positioned about the circumference of the turbine housing to create turbulence in accordance with a preferred embodiment of the present invention. FIG. 5B shows a longitudinal elevation view of FIG. 5A.

FIG. 6A shows a side cross sectional view of a turbine having an air inlet that directs into the stream of flow through the input side of the turbine in accordance with a preferred embodiment of the present invention. FIG. 6B shows a longitudinal elevation view of FIG. 6A.

FIG. 7A shows a cross sectional view of a front ejector about the circumference of the turbine housing in accordance with a preferred embodiment of the invention.

FIG. 7B shows a cross sectional view of a rear ejector about the circumference of the turbine housing in accordance with a preferred embodiment of the invention.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
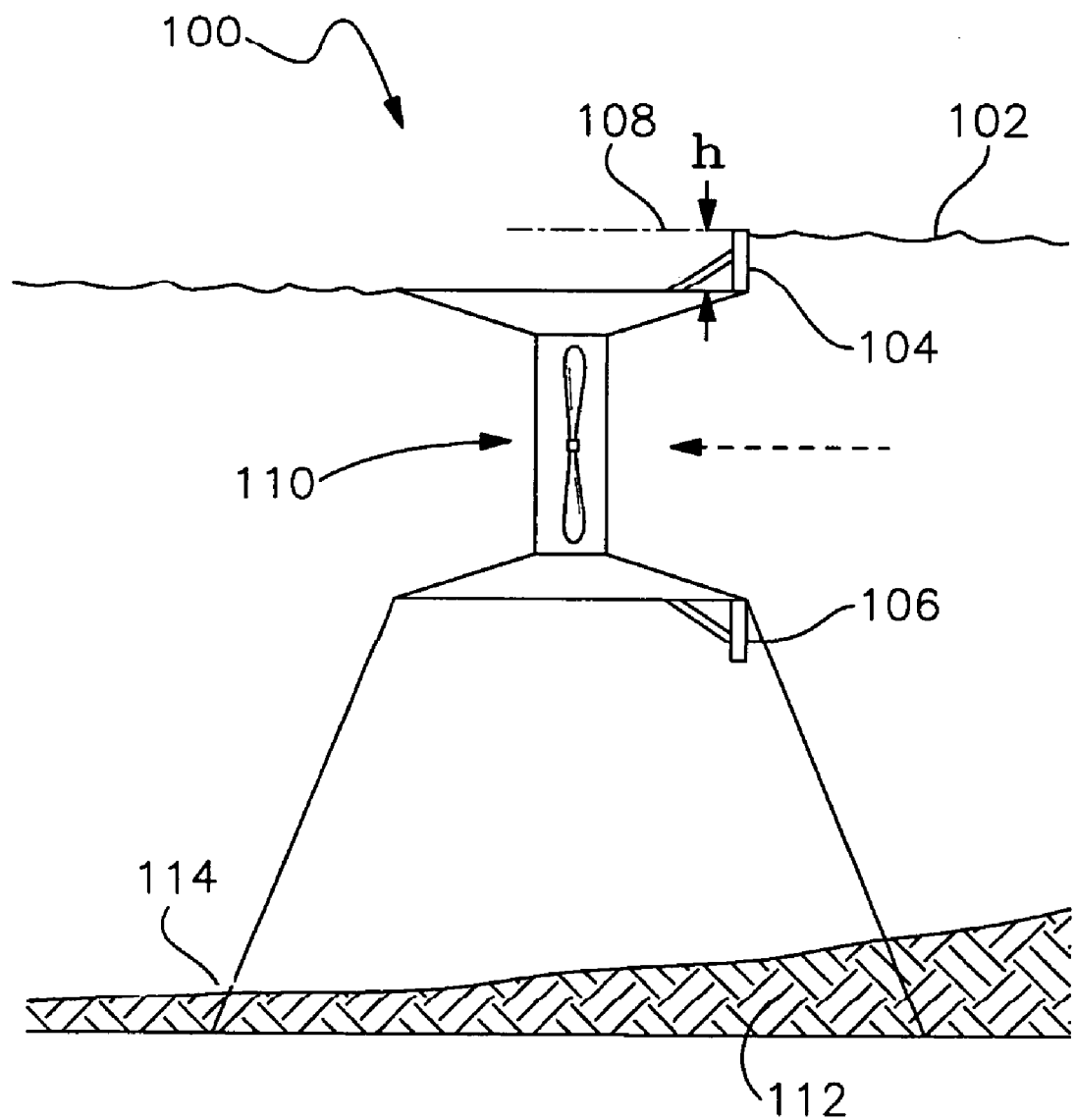
FIG. 1 shows a schematic diagram of a power generating station using head potential above a hydrokinetic turbine in accordance with a preferred embodiment of the invention.

FIG. 1 shows a floating turbine system 100 in a river, ocean, tidal area, or irrigation canal whereby current flow 14 moves through the turbine and generates power. As water approaches the turbine, a certain amount of the flow may be backed up due to the presence of the turbine. This backup may create a head effect which when combined with a blocking mechanisms 104 and 106 as shown, creates head potential which may be utilized in generating additional power. Head height "h" 108 as shown may be sufficient to then use that potential in another power generating turbine or other power generation system. Additional head creating mechanisms may be used as shown on the bottom of the turbine to further enhance the head effect.

Turbine 110 is moored to the river bed 112 (or ocean, tidal, or bottom or irrigation canal) by tethers 114 (however, it may also be moored on a monopile or between multiple pilings) and may be part of an array of turbines aligned to maximize exploitation of head potential of a number of turbine systems. This can be used in an array system or modular energy producing cell system. This can be used with temporary anchors or permanent attachment or temporary attachment to the ground at the bottom of the water body.

In a preferred embodiment of the invention, this system will create head in a flowing current that can be used by a hydrokinetic energy production system to enhance and increase the production of the system without building a dam or impoundment. By creating this head, the energy produced by the hydrokinetic system is a combination of kinetic energy derived from the flow of the current and the potential energy created by the non-impounded head. This head could be inches in height or up to feet in height depending on the implementation. In its operation, the hydrokinetic turbine installation of the present invention converts the kinetic energy in a current into usable power. Traditional hydroelectric turbine/generator systems installed using dammed water sources convert potential energy into usable power. More particularly, water flow from undammed sources that has the water flow characteristics modified, i.e. water flow pressure drop is modified to increase velocity across a hydrokinetic turbine installation to increase energy production further. The present invention can also be applied at an existing hydroelectric facility.

Taking advantage of head potential can be done in a number of ways according to the invention as more fully described below in FIGS. 2A through 7B. Aerofoils (hydrofoils) around the rotating turbine, slip streams, nested sets of ducts, or bubbling upstream or downstream components which may or may not rotate to modify pressure drop (velocity) at the rotating turbine will achieve some of the benefits of the present invention. Alternatively, one can use eductors, ejectors or counter rotating members to enhance velocity and thus increase power. In yet another embodiment, a nested set of counter rotating elements can also help increase velocity both in axial shaft and shaftless (circumferential generator) also called permanent magnet or magnetically levitated designs.

The present invention deals specifically with provisions for a stationary or rotating or counterrotating exterior blade about a hydrokinetic turbine to increase the pressure drop across the turbine, the desired result being that the turbine is enabled to operate using higher water velocity relative to the ambient, substantially increasing power production and enabling individual elements operating near the modes of their peak efficiencies.

This system could apply in a single duct or dual ducted turbine as well as unducted hydrokinetic units. In accordance with a preferred embodiment of the invention, there is also disclosed a method to control pressure drop for current based hydro kinetic devices for generating power in stand alone or array based structures in ocean currents, tidal currents, river currents, canals, and aqueducts that significantly enhance power generation versus non ducted and simple ducted (single or double) devices. Within those structures the primary objective to increase power output in a hydrokinetic current based system is by controlling pressure drop across the whole device or specifically sections/areas of the device. By controlling pressure drop one can increase velocity which has the highest impact on power output.

Figure 2A:
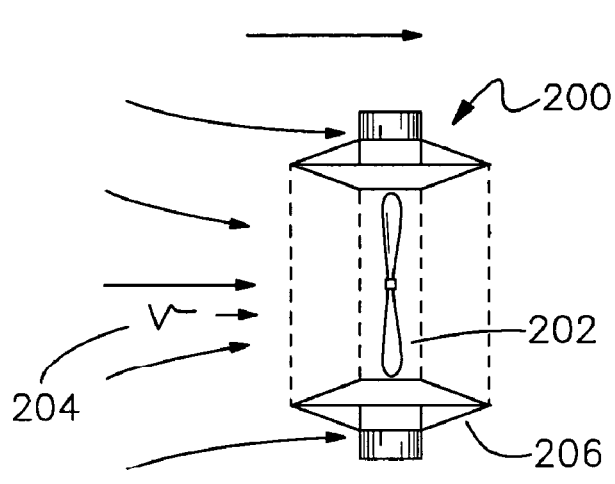
FIG. 2A shows a side cross sectional view of a stationary or rotating exterior blade mounted on a turbine in accordance with a preferred embodiment of the invention.
Figure 2B:
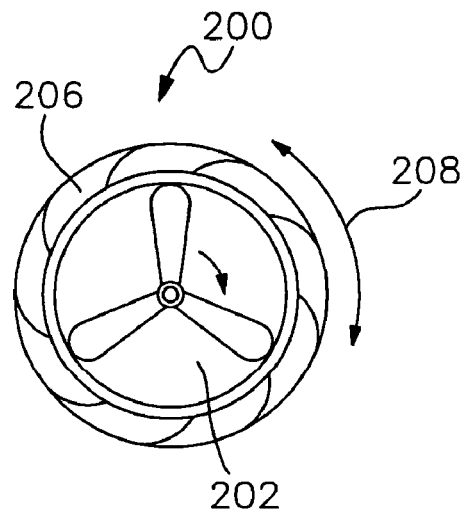
FIG. 2B shows a longitudinal elevation view of FIG. 2A.

Turning now to FIG. 2A, there is shown in side cross section a stationary or rotating exterior blade 206 circumferentially mounted on housing 200 about turbine 202. Blade 206 induces a swirl or vortex that increases flow across the turbine 202, thereby increasing velocity 204 of water across turbine 202 as the water pressure drop increases. FIG. 2B shows a cross sectional longitudinal view of the system where blade 206 may also be fixed but positioned in such a way as to lower pressure on the output side and create turbulence, swirl, a vortex or other flow features further increasing velocity. As exterior blade 206 rotates, a pressure drop is achieved around turbine 202 thus increasing velocity through turbine 202. Exterior blade 206 may be rotating or counter rotating 208 depending on the flow characteristics that are desired. Exterior blade 206 can also be fixed, acting like vanes to induce a vortex which can increase velocity and thus power output.

Figure 3A:
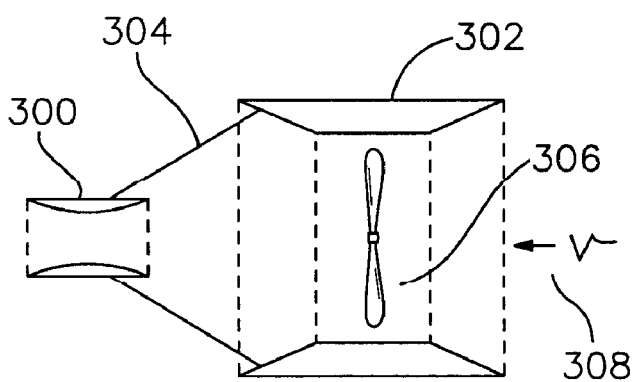
FIG. 3A shows a side cross sectional view of a cantilevered system in front of or behind the turbine unit in accordance with a preferred embodiment of the present invention.
Figure 3B:
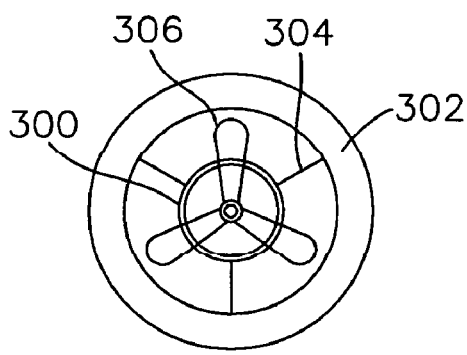
FIG. 3B shows a longitudinal elevation view of FIG. 3A.

FIG. 3A shows a side cross section of a cantilevered system 300 for guiding water flow behind turbine 306 and turbine unit housing 302. FIG. 3B shows a longitudinal front view of the same system is shown on the front side of turbine 306. In either configuration with the cantilevered system being placed in front of or behind the turbine 306, the added duct 304 operates to increase velocity 308 through turbine 306 and achieve the benefits of the present invention. In an alternative preferred embodiment the water flow and velocity 308 is reversed with cantilevered system 300 and duct 304 guiding the water flow into turbine 306. The position of the cantilevered system 300 can be such that the vertical cross section of the end of the cantilevered system 300 is in front or behind the vertical cross section of the end of the duct/housing 302 relative to the direction of flow. In another embodiment, the vertical cross section of the end of the cantilevered system 300 can be inside the vertical cross section of the end of the duct/housing 302 relative to the direction of flow.

FIG. 4A shows a circumferential fixed flange 400 with an angle relative to the horizontal housing greater than 20 degrees about turbine 406 that creates turbulence 402 and thus pressure drop which in turn enhances velocity through turbine 406 and increases power output. FIG. 4B shows a cross sectional longitudinal view of turbine 406 turbine housing 404 and flange 400. In an alternative preferred embodiment, flange 400 may also have freedom of movement for rotation 408 either clockwise or counterclockwise about turbine 406.

FIG. 5A shows a side cross section view of a radial eductor 500 positioned about the circumference of turbine housing 502 to create and control pressure drops thus increasing velocity 510 and thereby increasing power output. FIG. 5B shows a cross sectional longitudinal view of radial eductor which has an opening inlet 504 on input side of turbine 508 and an exit outlet 506 on the output side of turbine 508 and turbine housing 502.

FIG. 6A shows a side cross sectional view of turbine 608 and turbine housing 606 having an air tube system comprising an air tube 600, air inlet 604 and air outlet 610 that directs air into the water flow through the input side of the turbine 608 to affect the flow characteristics of turbine 608 and increase velocity 602. FIG. 6B shows a cross sectional longitudinal view of turbine 608, turbine housing 606 with air tube 600 and air inlet 604 to direct air into the water flow to increase velocity 602 and thus energy for extraction by turbine 608.

FIG. 7A shows in a cross sectional view a front ejector 700 about the circumference of turbine housing 702 and turbine 704 to decrease pressure across turbine 704 blade and thus increase velocity 708 and power output.

FIG. 7B show in a cross sectional view a rear ejector 706 about turbine 704 and the circumference of turbine housing 708, rear ejector 706 injecting water flow to decrease pressure across turbine 704 blade and thus increase velocity and power output.

While the invention has been described in connection with several preferred embodiments, it is not intended to limit the scope of the invention to the particular form set forth, but on the contrary, it is intended to cover such alternatives, modifications, and equivalents as may be included within the spirit and scope of the invention as defined by the claims.

What is claimed:

1. A system for power generation through movement of water comprising:
   one or more energy producing cells positioned in a moving body of water to receive kinetic energy;
   a blocking wall on the upper surface of said cells that creates head potential in said moving body of water;
   whereby said cells are positioned to receive potential energy in addition to the kinetic energy thereby converting said energy combination by the movement of water through said cell.

2. A system for power generation through movement of water comprising:
   one or more turbines positioned in a moving body of water to receive kinetic energy;
   a blocking wall on the upper surfaces of each of said turbines that creates head potential in said moving body of water;
   whereby said turbines are positioned to receive potential energy in addition to the kinetic energy thereby converting said energy combination by the movement of water through said turbines.

3. A system for power generation through movement of water as claimed in claim 1 further comprising:
   an array comprising said cells mechanically interconnected.

4. A system for power generation through movement of water as claimed in claim 1 further comprising:
   an array comprising said cells electrically interconnected.

5. A system for power generation through movement of water as claimed in claim 1 further comprising:
   a field comprising said cells mechanically and electrically interconnected, surface mounted, anchored to the water bottom.

6. A machine for power generation through movement of water as claimed in claim 1 wherein said cells are connected to a distribution power system through a generator.

7. A machine for power generation through movement of water as claimed in claim 1 further comprising a second blocking wall on the lower surface of said cells.

8. A machine for power generation as claimed in claim 1 further comprising said cells driven by kinetic energy and head potential combination created by said second blocking wall.

9. A system for improved power generation through movement of water comprising:
   one or more cells positioned in a moving body of water to receive kinetic energy;
   a blocking wall on the upper surface of said cells;
   said cells positioned to receive potential energy from water flow and kinetic energy from resultant head created by said blocking wall;
   a generally cylindrical housing about said cells and a circumferential rotating blade about said housing.

10. A system for improved power generation through movement of water as claimed in claim 9 further comprising:
    a circumferential stationary blade about said housing.

11. A system for improved power generation through movement of water as claimed in claim 9 further comprising:
    a cantilevered duct for guiding moving water into said cell inducing a pressure drop across a turbine.

12. A system for improved power generation through movement of water as claimed in claim 9 further comprising:
    a cantilevered duct for guiding moving water out of said cell inducing a pressure drop across a turbine.

13. A system for improved power generation through movement of water as claimed in claim 9 further comprising:
    a generally circumferential flange fixable attached to said housing inducing a pressure drop across a turbine.

14. A system for improved power generation through movement of water as claimed in claim 9 further comprising:
    a radial eductor fixably attached to said housing inducing a pressure drop across a turbine.

15. A system for improved power generation through movement of water as claimed in claim 9 further comprising:
    an air tube for injection of ambient air into moving water into said cells inducing a pressure drop across a turbine.

16. A system for improved power generation through movement of water as claimed in claim 9 further comprising:
    An air tube for injection of ambient air into moving water downstream from said cells inducing a pressure drop across a turbine.

17. A system for improved power generation through movement of water as claimed in claim 9 further comprising:
    A front ejector integral to said housing inducing a pressure drop across said cell.

18. A system for improved power generation through movement of water as claimed in claim 9 further comprising:
    a rear ejector integral to said housing inducing a pressure drop across said turbine.

* * * * *